W. QUINBY.
CULINARY UTENSIL.
APPLICATION FILED JUNE 4, 1908.

940,059.

Patented Nov. 16, 1909.

WITNESSES

INVENTOR
Wilfred Quinby
BY
Isaac B. Owens
ATTORNEY

UNITED STATES PATENT OFFICE.

WILFRED QUINBY, OF WHITE PLAINS, NEW YORK.

CULINARY UTENSIL.

940,059. Specification of Letters Patent. Patented Nov. 16, 1909.

Application filed June 4, 1908. Serial No. 436,592.

*To all whom it may concern:*

Be it known that I, WILFRED QUINBY, of White Plains, county of Westchester, and State of New York, have invented certain new and useful Improvements in Culinary Utensils, of which the following is a full, clear, and exact specification, such as will enable others skilled in the art to which it appertains to make and use the same.

The invention relates to an improved device for extracting the milk from green corn in the manner which is usually practiced in the preparation of articles of food composed in whole or in part of the corn juice, and it consists of certain peculiar features of construction which will be fully set forth hereinafter and particularly pointed out in the claims.

Figure 1:
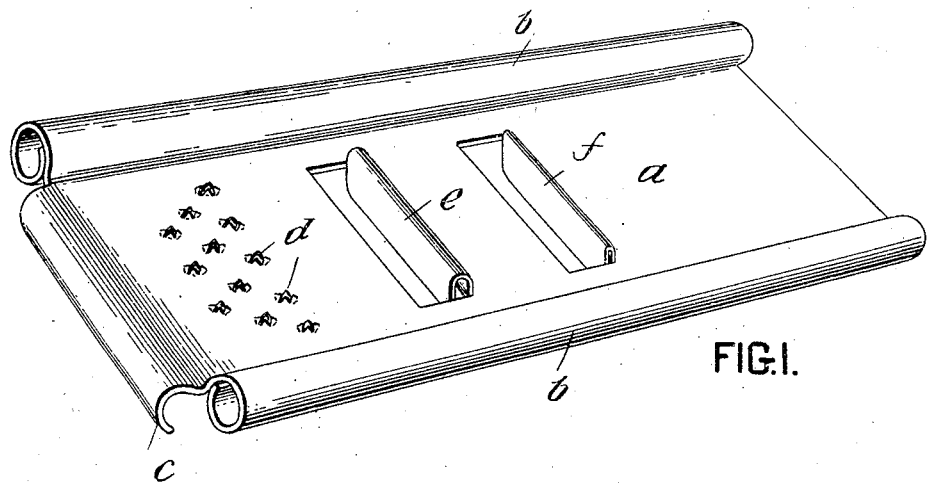
Figure 2:
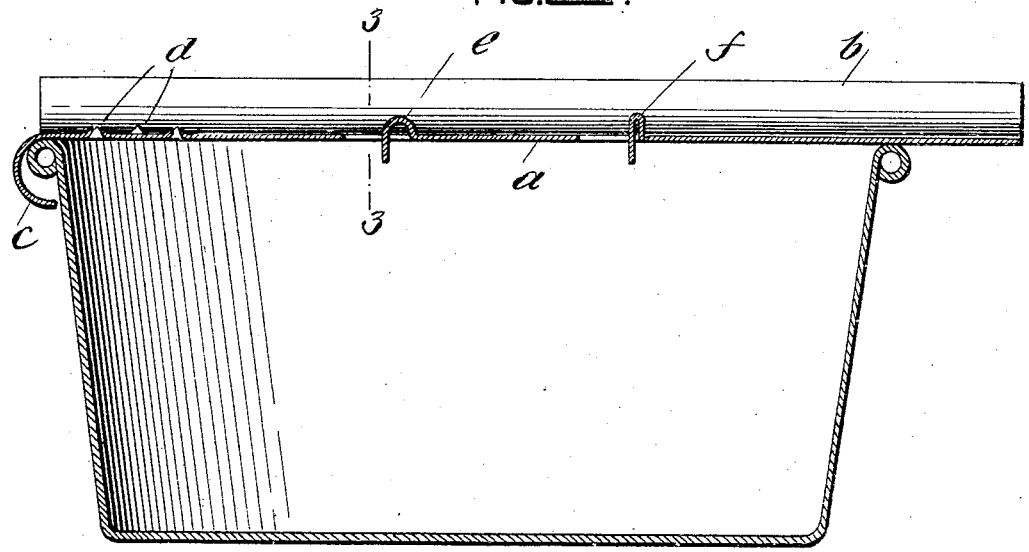
Figure 3:
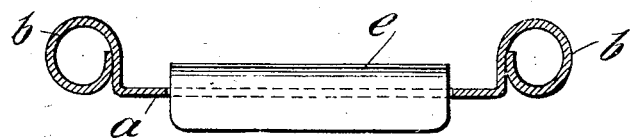

Reference is had to the accompanying drawings, which illustrate, as an example, one manner of embodying my invention, in which drawings, Figure 1 is a perspective view of the device; Fig. 2 is an enlarged longitudinal section showing the device in use; and Fig. 3 is an enlarged transverse section on the line 3—3 of Fig. 2.

The device is constructed by preference of an integral sheet of metal $a$ elongated as shown in Fig. 1 and provided at its edges with rolls $b$ or other means for stiffening the metal sheet. These rolls are raised above the surface of the sheet as shown in Fig. 3 and also serve as means for guiding the corn as it is moved over the device. At its front end the device is formed with a downwardly exposed hook $c$ adapted to engage the edge of the pan as indicated in Fig. 2, the device extending across the pan and its opposite end portion resting on the rim of the pan as shown. At its front portion, the sheet $a$ is formed with a number of incisor points $d$. This may be done in any manner, but it may be cheaply and effectually done by forming a number of upward punctures in the metal plate leaving sharp projecting edges which serve to pierce or lacerate the hull of the corn so that the liquid contents thereof may be expelled. Rearward of the incisor points $d$ are two ribs $e$ and $f$ formed preferably by stamping them out from the metal sheet. Of these ribs the rib $e$ is adjacent to the incisor points and is formed round on its top while the rib $f$ is made considerably sharper.

In the use of the device the ear of green corn held in the hand of the user is moved longitudinally over the device between the guide rolls $b$. The hulls of the grains of corn are cut by the points $d$ and the cut grains are advanced first against the rib $e$ which presses out the liquid or milk of the corn without, however, tearing away the hulls or even extruding the solid matter or kernel thereof. Finally the corn reaches the sharp flange $f$ which completes the operation.

It will be perceived that by forming the ribs $e$ and $f$ by striking them up from the sheet metal, openings are made through which the liquid may pass into the pan below. In respect to these ribs it is pointed out that their number is not essential nor is it essential to make any difference in the form thereof, although that shown in the drawings is deemed preferable.

Having thus described my invention, what I claim as new and desire to secure by Letters Patent of the United States is:

1. A device for extracting milk from green corn comprising a metal plate having an incisor tooth or teeth projecting upward from the surface thereof and two ribs projecting upward from the plate beyond the incisor teeth, the rib adjacent to said teeth being relatively round and the rib beyond relatively sharp for the purpose specified.

2. A device for extracting the milk from green corn, which consists in a metal plate having rolled side edges to stiffen it and a hook at one end to engage the edge of a pan, said plate having an incisor tooth or teeth projecting upward from its surface and having two ribs beyond the teeth, the ribs being transversely disposed and the rib near the teeth being relatively round and the rib beyond relatively sharp, for the purpose specified.

In testimony whereof I have signed my name to this specification in the presence of two subscribing witnesses.

WILFRED QUINBY.

Witnesses:
 ISAAC B. OWENS,
 E. I. McLAUGHLIN.